(12) United States Patent
Tinnin et al.

(10) Patent No.: US 11,685,423 B1
(45) Date of Patent: Jun. 27, 2023

(54) ENERGY ABSORBING APPARATUS

(71) Applicant: Steering Solutions IP Holding Corporation, Saginaw, MI (US)

(72) Inventors: Melvin L. Tinnin, Clio, MI (US); Joen C. Bodtker, Flint, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 17/555,183

(22) Filed: Dec. 17, 2021

(51) Int. Cl.
*B62D 1/19* (2006.01)
*B62D 1/184* (2006.01)

(52) U.S. Cl.
CPC ............. *B62D 1/195* (2013.01); *B62D 1/184* (2013.01)

(58) Field of Classification Search
CPC ................................ B62D 1/195; B62D 1/184
See application file for complete search history.

(56) References Cited

U.S. PATENT DOCUMENTS

| | | | | |
|---|---|---|---|---|
| 9,834,246 | B1* | 12/2017 | Woycik | B62D 1/195 |
| 11,091,198 | B2* | 8/2021 | Bodtker | B62D 7/22 |
| 2007/0194563 | A1* | 8/2007 | Menjak | B62D 1/195 |
| | | | | 280/777 |
| 2007/0228716 | A1* | 10/2007 | Menjak | B62D 1/192 |
| | | | | 280/777 |
| 2019/0135328 | A1* | 5/2019 | Fricke | B62D 1/185 |
| 2019/0225255 | A1* | 7/2019 | Ishimura | B62D 1/185 |
| 2022/0073125 | A1* | 3/2022 | Sauquet | B62D 1/181 |
| 2022/0126907 | A1* | 4/2022 | Dubay | F16F 7/126 |

* cited by examiner

*Primary Examiner* — Drew J Brown
(74) *Attorney, Agent, or Firm* — Dickinson Wright PLLC

(57) ABSTRACT

A steering column comprising a first jacket and a second jacket that is axially movable with respect to the first jacket. The first jacket includes an aperture. An energy absorbing apparatus includes a strap body extending between a first end and a second end and a curved portion located between the first end and the second end. The first end includes a first connector and the second end includes a second connector selectively connected to the first connector through the aperture in the first jacket.

18 Claims, 8 Drawing Sheets

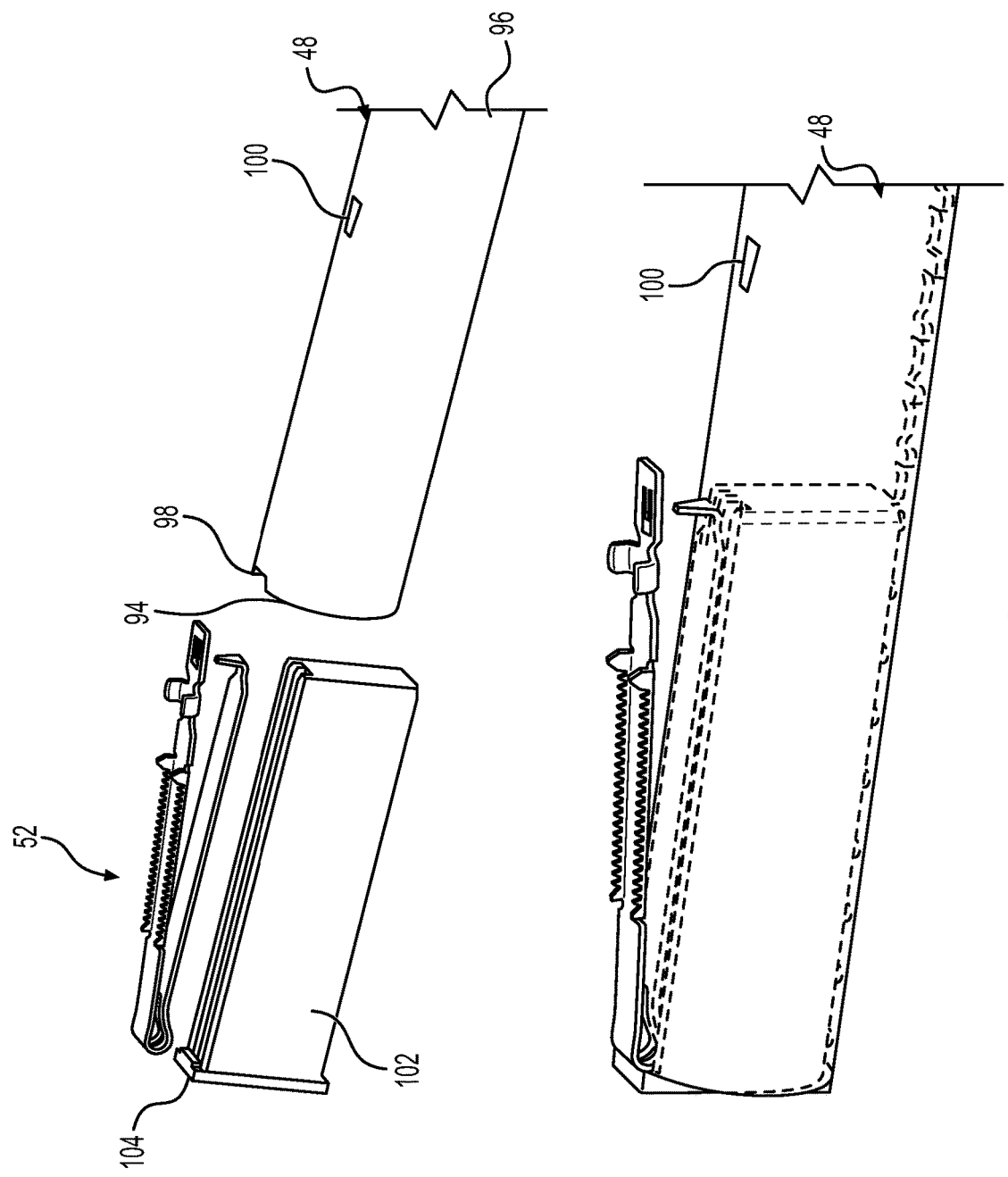

US 11,685,423 B1

ENERGY ABSORBING APPARATUS

TECHNICAL FIELD

The following description relates to energy absorbing devices, and more particularly, to an energy absorbing apparatus for a steering column assembly.

BACKGROUND

A vehicle, such as a car, truck, sport utility vehicle, crossover, mini-van, marine craft, aircraft, all-terrain vehicle, recreational vehicle, or other suitable vehicles, include various steering system schemes, for example, steer-by-wire and driver interface steering. These steering system schemes typically include a steering column assembly for translating steering input to an output that interacts with a steering linkage to ultimately cause the vehicle wheels to turn. Steering columns often include various safety features, such as airbags to lessen impact forces. In addition, many steering column assemblies are collapsible and include one or more energy absorption features, such as energy absorbing straps, that allow a certain amount of compression.

Some energy absorbing straps are configured to roll along their length to absorb energy, and are often referred to as roll straps. Typically, roll straps absorb energy during the deformation of the strap in an impact event wherein kinetic energy can be dissipated through compression of the steering column assembly. When designing an energy absorption strap, some principle considerations include load requirements, tuneability, and packaging. Performance of the energy absorption strap in a collapse event has traditionally been influenced by many factors, including material thickness/width, material properties, and or shapes or features of the strap. As such, performance of the energy absorption strap can be changed on a vehicle-by-vehicle basis via a modification of these characteristics, but often packaging requirements limit the changes that can be made and can become quite complex to fulfill specific requirements during specific stages of the collapse cycle. For example, many pieces are required to connect a translating upper jacket to a jackscrew nut, requiring multiple assembly steps. The lower jacket is oftentimes also required to have large gaps to allow for strap travel, which requires added material to compensate for lost rigidity and strength. Space also oftentimes has to be made for a tail of the strap to feed out unimpeded to control the absorption load further creating packaging difficulties.

Accordingly, there is a continuing need to improve the operational framework of energy absorption features to improve upon packaging, load requirements, and tuneabiltiy.

SUMMARY

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims. This section provides a general summary of the disclosure and is not to be interpreted as a complete and comprehensive listing of all of the objects, aspects, features and advantages associated with the present disclosure.

An aspect of the disclosure includes an energy absorbing apparatus. The energy absorbing apparatus comprises a strap body extending between a first end and a second end. A curved portion of the strap body is located between the first end and the second end. The first end includes a first connector and the second end includes a second connector selectively connected to the first connector.

Another aspect of the disclosure includes a steering column. The steering column comprises a first jacket and a second jacket that is axially movable with respect to the first jacket. The first jacket includes an aperture. An energy absorbing apparatus includes a strap body extending between a first end and a second end and a curved portion located between the first end and the second end. The first end includes a first connector and the second end includes a second connector selectively connected to the first connector through the aperture in the first jacket.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 4 generally illustrates the first arrangement of the strap body being connected to the first jacket.

DETAILED DESCRIPTION

The following discussion is directed to various embodiments of the disclosure. Although one or more of these embodiments may be described in more detail than others, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable vehicles, include various steering system schemes, for example, steer-by-wire and driver interface steering. These steering system schemes typically include a steering column assembly for translating steering input to an output that interacts with a steering linkage to ultimately cause the vehicle wheels to turn. Steering columns include various safety features, such as airbags to lessen impact forces. In addition, many steering column assemblies are collapsible and include one or more energy absorption features, such as energy absorbing straps, that allow a certain amount of compression.

Figure 1:
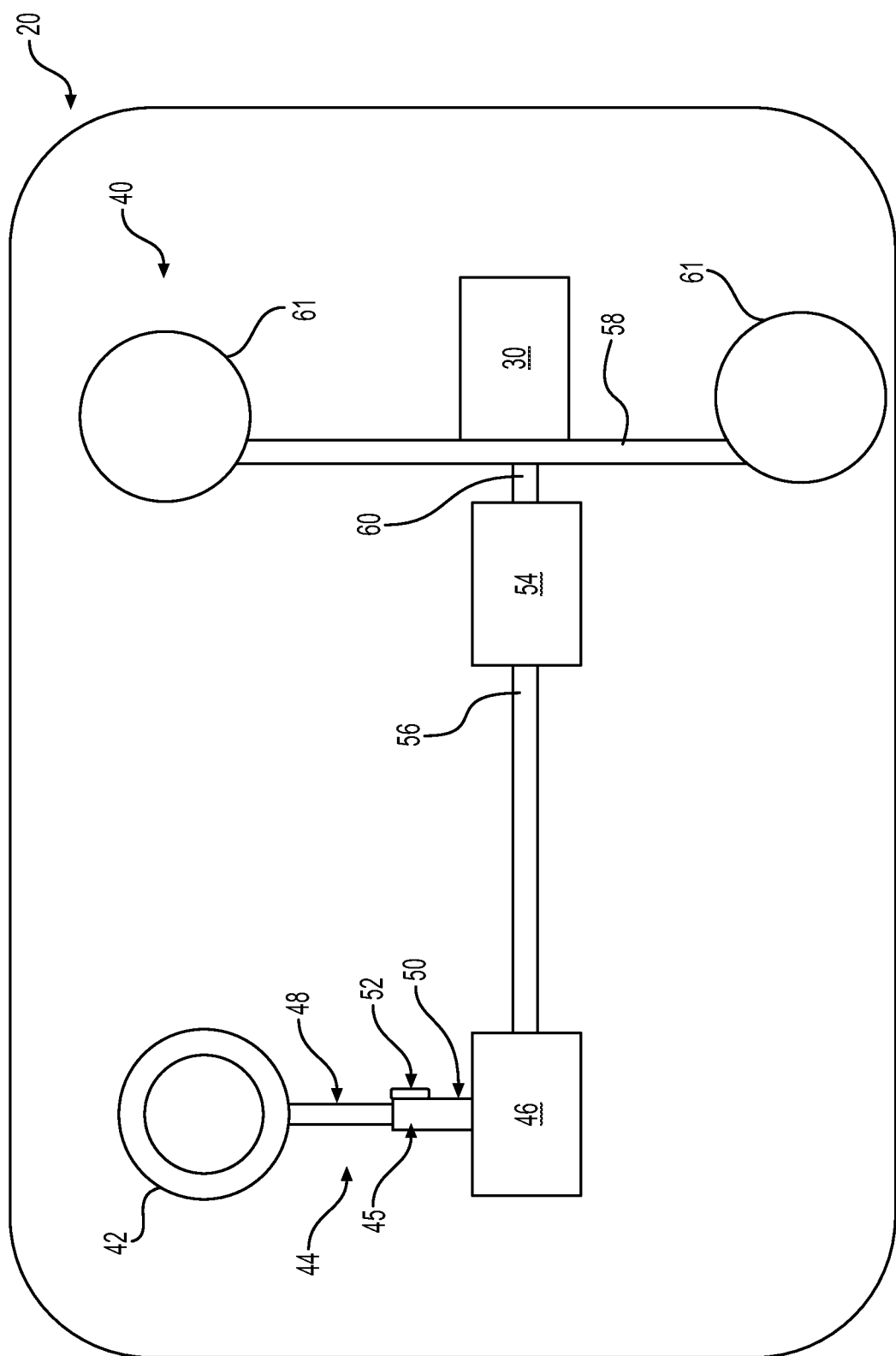
FIG. 1 generally illustrates a vehicle with a steering system according to the principles of the present disclosure.

Referring initially to FIG. 1, a vehicle 20 is generally illustrated according to the principles of the present disclosure. The vehicle 20 may include any suitable vehicle, such as a car, a truck, a sport utility vehicle, a mini-van, a crossover, any other passenger vehicle, any suitable commercial vehicle, or any other suitable vehicle. While the vehicle 20 may be a passenger vehicle having wheels and for use on roads, the principles of the present disclosure may apply to other vehicles, such as planes, tractors, boats, or other suitable vehicles. The vehicle 20 may include a propulsion system 30, such as an ignition system, an electronic system, or combinations thereof.

In some embodiments, the vehicle 20 may further include a steering system 40. The steering system 40 may be configured as a driver interface steering system, an autonomous driving system, or a system that allows for both driver interface and autonomous steering. The steering system may include an input device 42, such as a steering wheel, wherein a driver may mechanically provide a steering input by turning the steering wheel. A steering column assembly 44 may include a steering column 45 that extends along an axis from the input device 42 to an output assembly 46. The output assembly 46 may include a pinion shaft assembly, an I-shaft, a cardan joint, steer-by-wire components or any other features conventionally located opposite the input device 42.

The steering column 45 may include at least two axially adjustable portions, for example, a first jacket 48 and a second jacket 50 that are axially adjustable with respect to one another. The first jacket 48 may be an upper jacket and a second jacket 50 may be a lower jacket, wherein the first jacket 48 and the second jacket 50 are permitted to move axially with respect to one another during an impact or other compressive forces. The axial movement may include sliding, telescopic, translating, and other axial movements. The steering column assembly 44 may include additional portions that permit axial movement and brackets that provide rake and tilt movement. More particularly, the steering column assembly 44 may include a powered actuator (not shown) wherein the axial adjustments are machine driven.

An energy absorbing apparatus 52 may be located on one or each of the first jacket 48, the second jacket 50, any brackets, or combinations thereof, and provide variable stroke load absorption settings. The energy absorbing apparatus may dissipate kinetic energy between the first jacket 48 and the second jacket 50.

A steering gear assembly 54 may connect to the output assembly 46 via a steering gear input shaft 56. The steering gear assembly 54 may be configured as a rack-and-pinion, a recirculating ball-type steering gear, or any other types of steering gears associated with autonomous and driver-interface steering systems. The steering gear assembly 54 may then connect to a driving axle 58 via a output shaft 60. The output shaft 60 may include a pitman arm and sector gear or other traditional components. The output shaft 60 is operably connected to the steering gear assembly 54 such that a rotation of the steering gear input shaft 56 causes a responsive movement of the output shaft 60 and causes the drive axel to turn the wheels 61.

Figure 2:
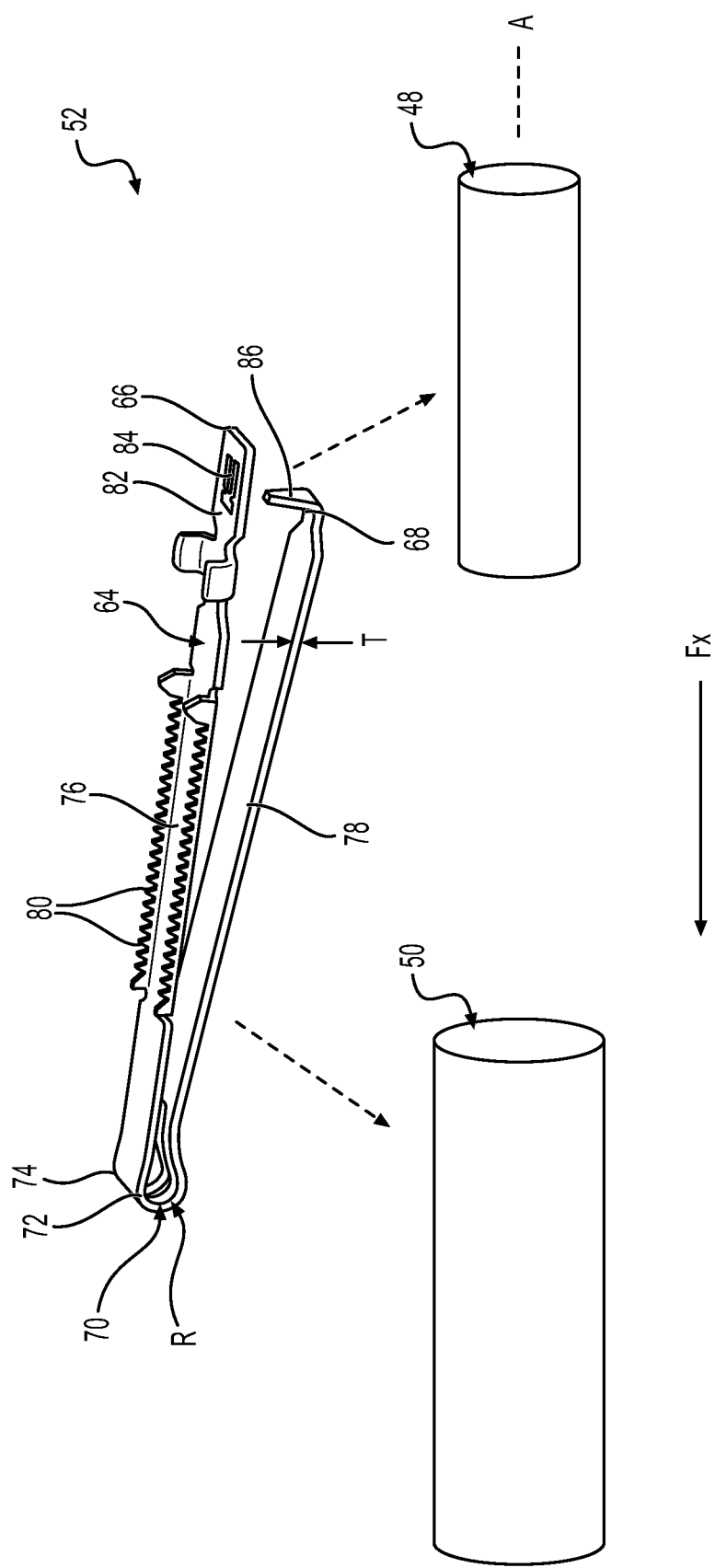
FIG. 2 generally illustrates an energy absorbing apparatus including a first arrangement of a strap body for dissipating kinetic energy between a first jacket and a second jacket of a steering column that are axially adjustable.

FIG. 2 illustrates the energy absorbing apparatus 52. The energy absorbing apparatus 52 may be connected to the first jacket 48 (upper jacket), the second jacket 50 (lower jacket), or a combination thereof. In some embodiments, the energy absorption apparatus 52 includes an energy absorbing roll strap body 64 that is at least partially coupled between the first jacket 48 and the second jacket 50. During a collapse event, a force 'Fx' may move or collapse the first jacket 48 or second jacket 50 along axis A and the energy absorbing apparatus 52 dissipates at least some of the kinetic energy of collapsing first jacket 48 and the second jacket 50.

With continued reference to FIG. 2, in some embodiments, the energy absorbing roll strap body 64 may include a first end 66 and a second end 68 spaced from the first end 66 by an intermediate portion 70. The intermediate portion 70 includes a curved portion 72 having a radius 'R'. The curved portion 72 may facilitate "rolling" of strap body 64 during a collapse event as the second end 68 moves in the direction of force 'Fx' and the first end 66 remains stationary with the second jacket 50 via a series of teeth 80. The intermediate portion 70 may include an initial collapse or roll area 74 that is located between the curved portion 72 and a first flat portion 76 that extends from the first flat portion 76 and a second flat portion 78. The initial collapse area 74 packages the strap body 64 to an end of the first jacket 48 and provides the starting roll or deformation location where the "roll" or deformation of a portion of the strap body 64 begins during a collapse event. The second flat portion 78 may extend between the intermediate portion 70 and the second end 68. The first flat portion 76 may define the series of teeth 80 extending therefrom towards the first end 66. The teeth 80 may be located in rows on opposite edges of the first flat portion 76. Each row of teeth 80 may include an end tooth nearest the first end 66 that is larger than the other teeth 80 to limit travel (e.g. as a hard stop). The strap body 64 defines a thickness "T". In some embodiments, the first end 66 defines a first connector and the second end 68 defines a second connector. For example, the first end 66 defines an opening 82 including a spring finger 84 projecting into the opening 82 and the second end 68 includes a tail portion 86 angled towards the opening 82.

Figure 3A:
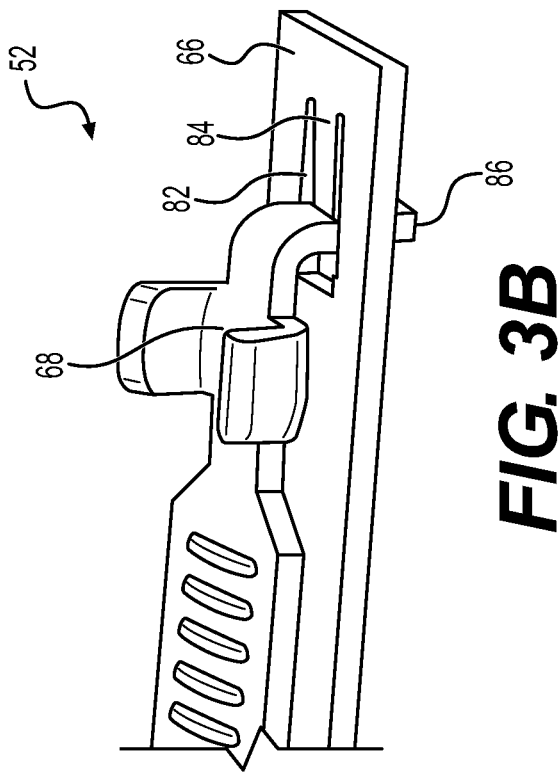
FIG. 3A generally illustrates the first arrangement of the strap body in a connected position.
Figure 3B:
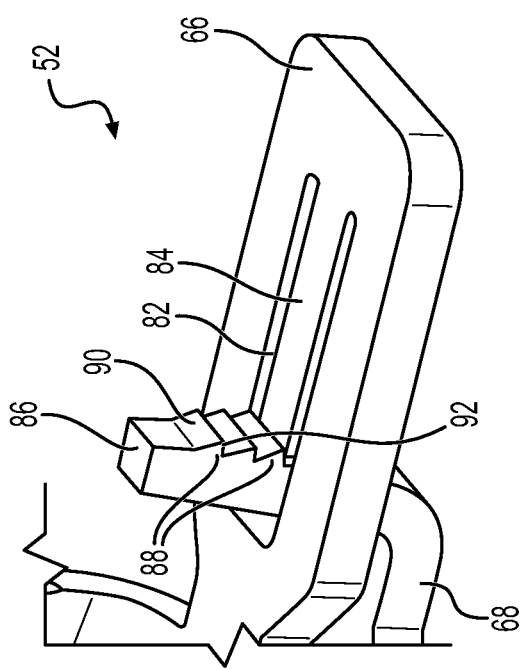
FIG. 3B generally illustrates a second arrangement of the strap body in a connected position.
Figure 3C:
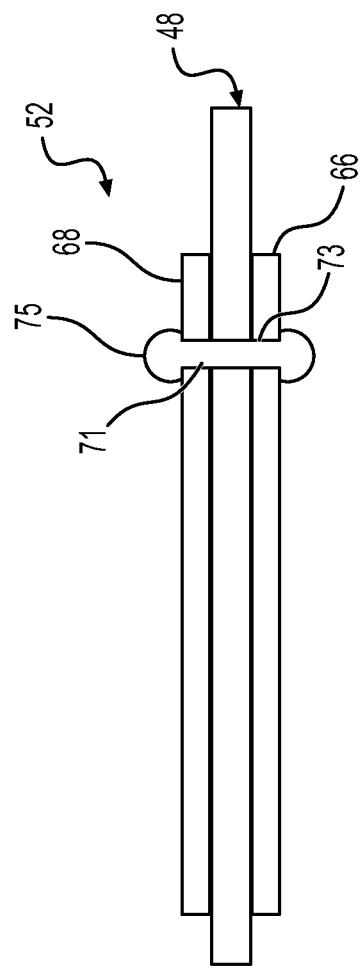
FIG. 3C generally illustrates a third arrangement of the strap body in a connected position.

As best illustrated in FIGS. 3A and 3B, the spring finger 84 contacts the tail portion 86 such that the tail portion 86 is retained in the opening 82. The tail portion 86 may extend from the second end 68 at an angle towards the spring finger 84 for additional retaining force. In some embodiments, the tail portion 86 may include serrations 88 having at least one wedge surface 90 angled towards the spring finger 84 that prevents removal of the tail portion 92 from the opening 82. In some embodiments, the serrations 88 may include at least one cam surface 92 on an opposite side of the wedge surface 90 that contacts the spring finger 84 and allow it to ratchet into secured engagement with the at least one wedge surface 90. The plurality of serrations 88 may be spaced to compensate for a variety of tolerances thus permitting multiple settings for different jacket sizes and configurations. The wedge surface 90 may extend from the tail portion 86 at a different angle than the cam surface 92. As such, the spring finger 84 may form a non-backdriveable ("no-back") connection with the tail portion 92 to prevent unwanted disassembly. In the arrangements of the absorption apparatus 52 illustrated in FIGS. 3A and 3B, there are no additional bracket or fastener requirements for assembly (e.g. it is self-retained). FIG. 3C illustrates an alternative arrangement wherein the first end 66 defines a first connector and the second end 68 defines a second connector. For example, the first connector may include a first aperture 71 and the second connector may include a second aperture 73. After the first connector and the second connector are aligned, a fastener 75 may be located in the first aperture 71, the second aperture 73, and the first jacket 48.

The energy absorption apparatus 52 illustrated in FIGS. 3A through 3C may be configured to be utilized within only the collapse distance of the first jacket 48 and the strap body 64 does not require to be fed into any voids or chambers in the steering column. Moreover, it should be appreciated that the tail portion 86 may be located on the first end 66 (FIG. 3A) or the second end 68 (FIG. 3B) and the opening 82 and the spring finger 84 may be located on an opposite end 66, 68.

With reference now to FIG. 4, in some embodiments, the roll strap body 64 may be connected directly to the first jacket 48, which may be an upper, inner jacket. The first jacket 48 may extend between a lower end 94 that is inserted into the second jacket 50 and an upper end 96 that is opposite of the lower end 94. The lower end 94 may include a notch 98 that has a wedge-shape and is sized to insert the curved portion 72 and an aperture 100 spaced between the lower end 94 and the upper end 96 for placing the tail portion 86. The wedge-shaped notch 98 delashes side-to-side movement while establishing a location of the strap body 64 along the axis A. Therefore, the roll strap body 64 may only be connected to the first jacket 48, without any fasteners. During assembly, a mandrel 102 with a back support 104 may carry the roll strap body 64 into the first jacket 48 until the tail portion 86 projects through the aperture 100 and the curved portion 72 is located in the notch 98, after which the tail portion 86 can be inserted into the opening 82 and into contact with the spring finger 84 wherein it can be ratcheted and locked. In some embodiments, the aperture 100 defines a wedge-shape and the tail portion 86 defines a wedge-shape. As such, when the tail portion 86 is inserted into the aperture 100 and ratcheted, or otherwise fastened thereto, the tail portion 86 cinches into the aperture 100 via interfacing wedge surfaces and the curved portion 70 is seated into the notch 98. As the curved portion 70 is seated into the notch 98, the curved portion 70 is secured within the wedge-shape of the notch 98. The wedge-shape of the notch 98, the tail portion 86, and the aperture 100 provide delashing and/or accommodate variety of tolerances.

Figure 5:
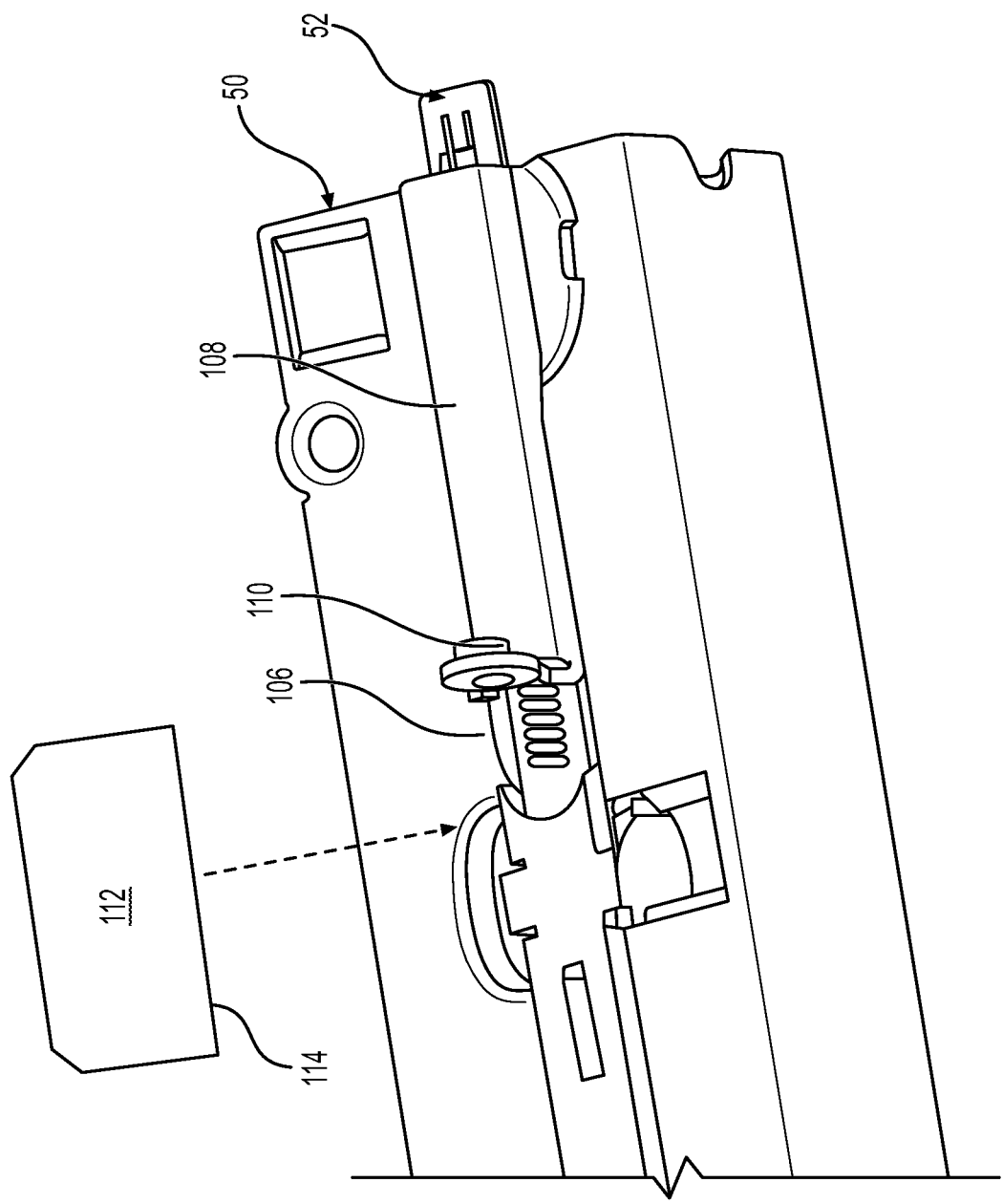
FIG. 5 generally illustrates the second jacket including a window for providing access to the strap body.

With reference now to FIG. 5, the second jacket 50 is illustrated as a lower, outer jacket that fits over the first jacket 48. In some embodiments, the second jacket 50 defines a window 106 that provides access to the strap body 64, and more particularly the teeth 80 formed thereon. The window 106 may be sized to only expose a small length of the strap body 64 and a strap body width improving the strength of the second jacket 50. The second jacket 50 may further include a strap channel 108 raised from an outer surface thereof for providing space to the strap body 64. The second jacket 50 may further include one or more projections 110 extending around the window 106 for attachment to a strap actuator 112. The strap actuator 112 may include a series of teeth 114 that selectively intermesh the teeth 80 on the strap body 64 to cause the position of the steering column assembly 44 to lock until the force Fx overcomes the connection between the tail portion 86 and the spring finger 84 causing the strap body 64 to "roll" and dissipate the force Fx.

Figure 6A:
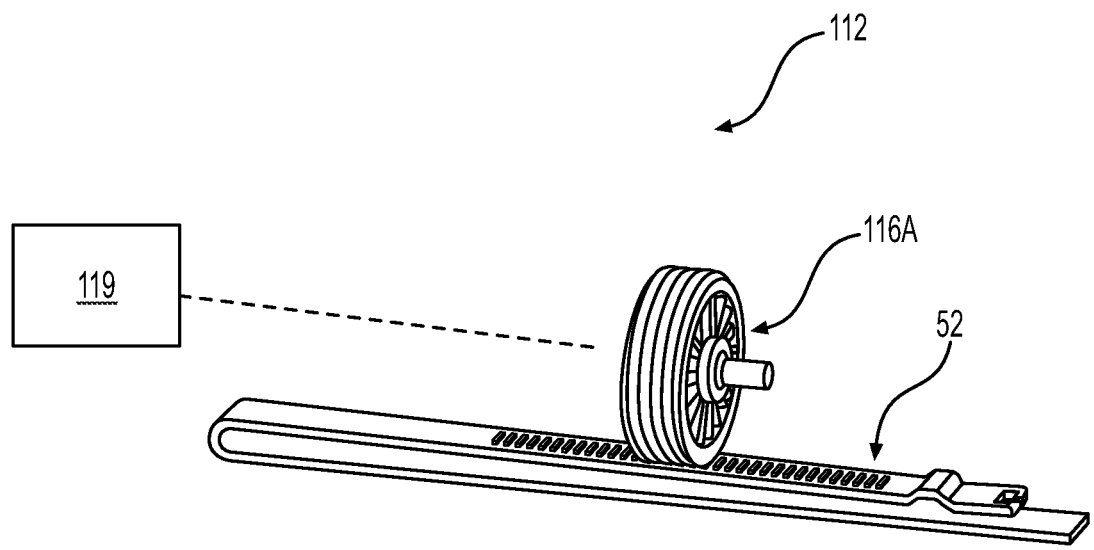
FIGS. 6A and 6B generally illustrate various embodiments of a strap actuator for controlling actuation of the strap body.
Figure 6B:
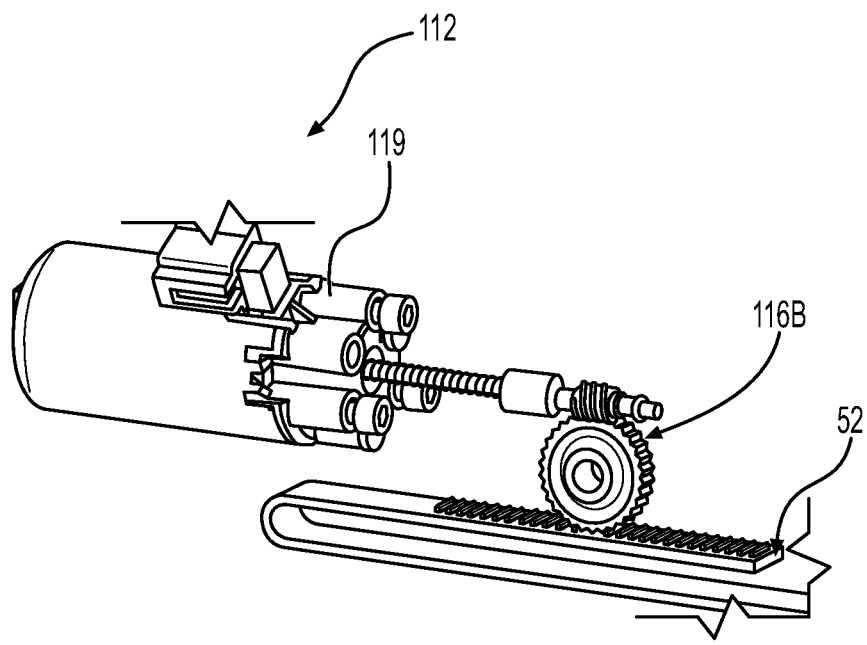

FIGS. 6A and 6B illustrate various embodiments of the strap actuator 112. Referring initially to FIG. 6A, the strap actuator 112 may include a gear 116A defining helical teeth 114 driven by a motor 119. Operation of the motor 119 may be via a control system (not shown). In FIG. 6B, the gear 116B includes a sprocket configuration driven by a helical worm gear. The gears 116A and 116B may have other configurations and transfer force to the teeth 80 on the strap body 64.

Figure 7:
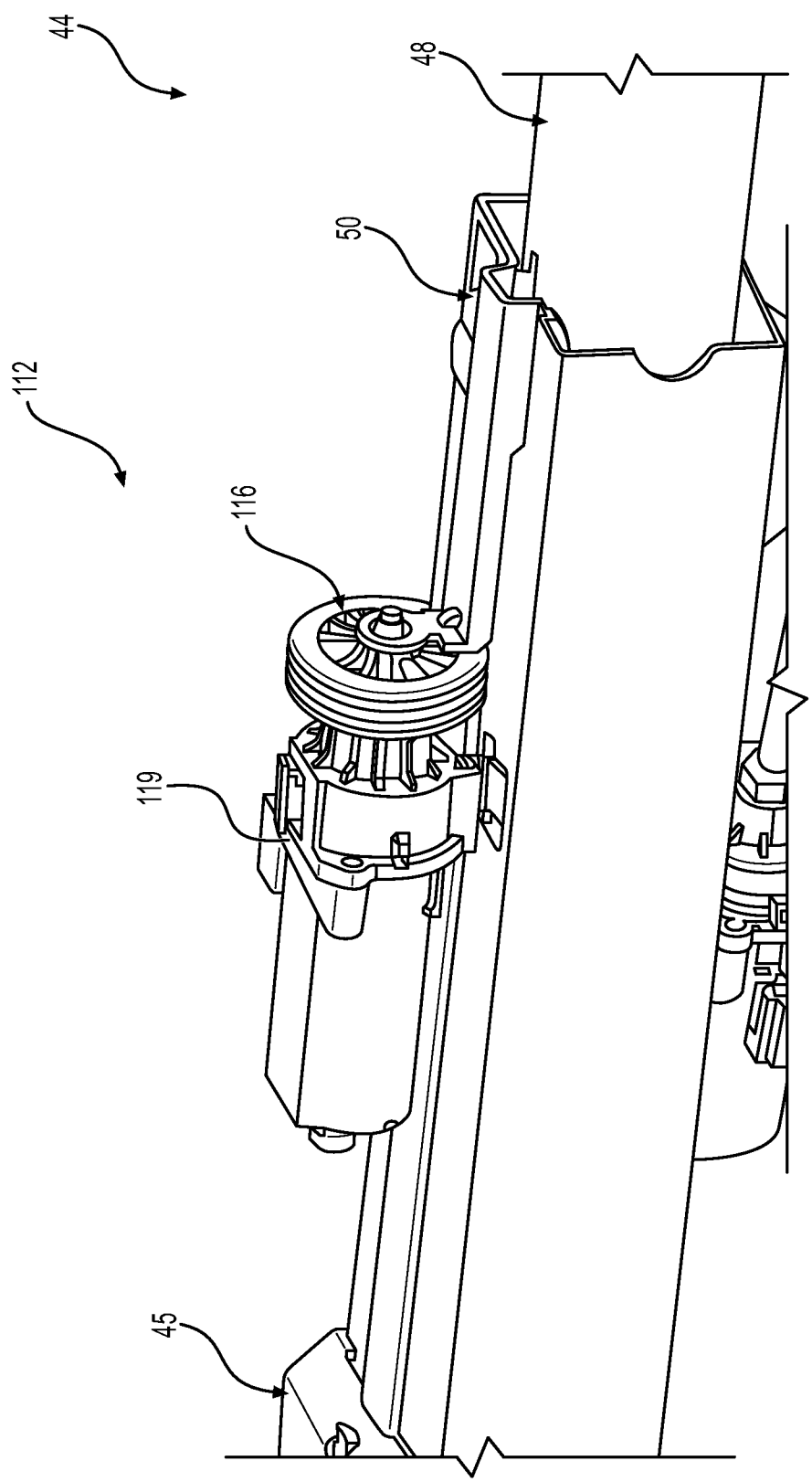
FIG. 7 generally illustrates the strap actuator according to one embodiment connected to the second jacket.

FIG. 7 illustrates an embodiment wherein the gear 116 includes a helical configuration. The gear 116 may be configured to rotate in response to the travel of the first jacket 48 or may otherwise by driven by motor 119 in response to a steering column actuator 120 that moves the first jacket 48 relative to the second jacket 50 along the axis A.

Figure 8:
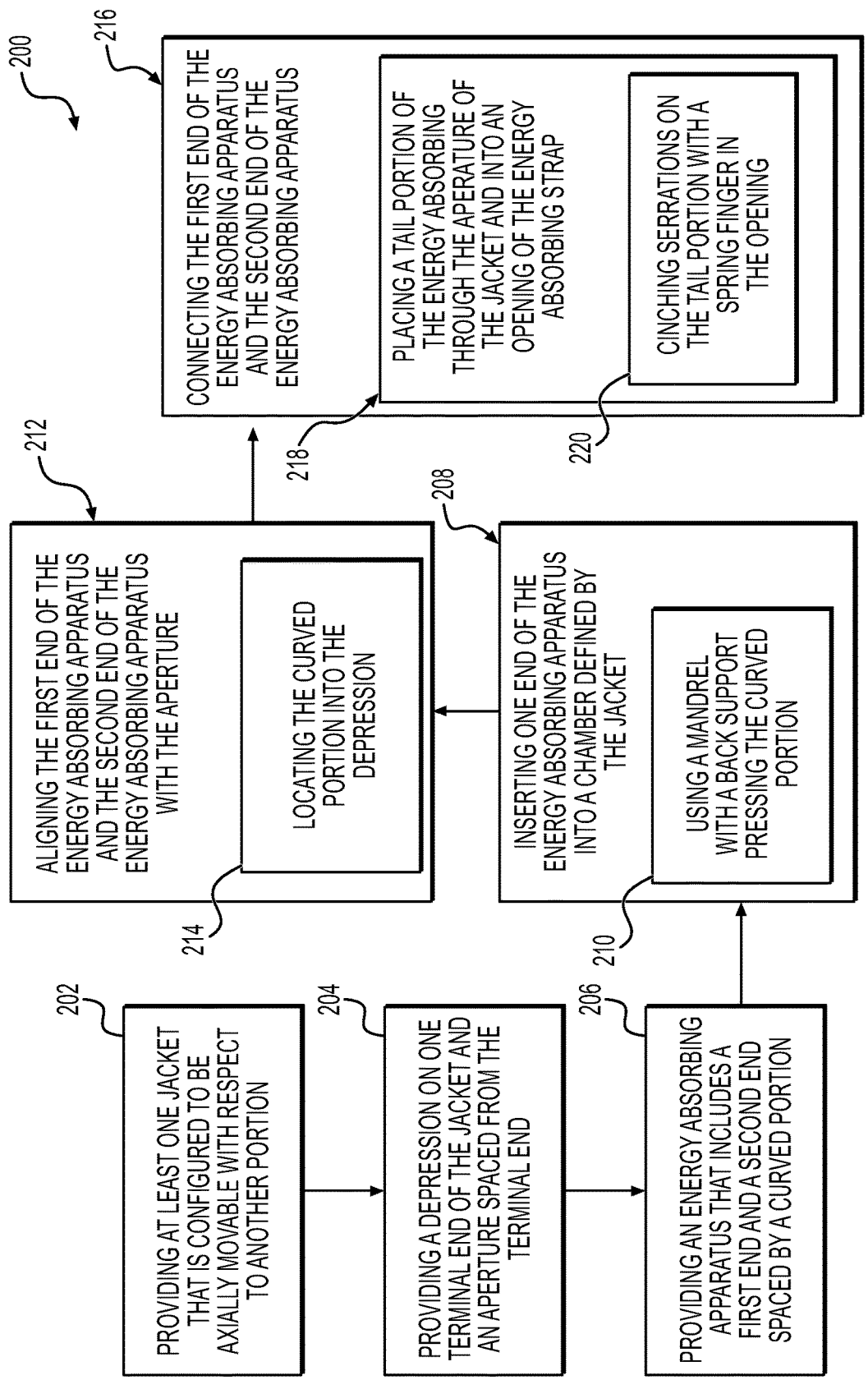
FIG. 8 is a method flow chart illustrating attaching the energy absorbing apparatus to the steering column.

FIG. 8 illustrates a method 200 flow chart for assembling and controlling a steering column assembly. At 202, the method 200 includes providing at least one jacket that is configured to be axially movable with respect to another portion. At 204, the method 200 includes providing a notch on one terminal end of the jacket and an aperture spaced from the terminal end. At 206, the method 200 includes providing an energy absorbing apparatus that includes a first end and a second end spaced by a curved portion. At 208, the method 200 includes inserting one end of the energy absorbing apparatus into a chamber defined by the jacket. For example, step 208 may, at 210, include using a mandrel with a back support pressing the curved portion. At 212, the method 200 includes aligning the first end of the energy absorbing apparatus and the second end of the energy absorbing apparatus with the aperture. Step 212 may, at 214, further include locating the curved portion into the notch. At 216, the method includes connecting first end of the energy absorbing apparatus and the second end of the energy absorbing apparatus. For example, step 216 may, at 218, include placing a tail portion of the energy absorbing strap as described herein through the aperture of the jacket and into an opening of the energy absorbing strap as described herein. Step 218 may, at 220, include cinching serrations on the tail portion with a spring finger in the opening.

While the invention has been described in detail in connection with only a limited number of embodiments, it is to be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Moreover, any feature, element, component or advantage of any one embodiment can be used on any of the other embodiments. Accordingly, the invention is not to be seen as limited by the foregoing description.

What is claimed is:

1. An energy absorbing apparatus for a steering column comprising:
   a strap body extending between a first end and a second end;
   a curved portion located between the first end and the second end; and the first end including a first connector and the second end including a second connector selectively connected to the first connector, wherein the first connector includes a tail portion, wherein the tail portion includes at least one serration that cinches to the second connector.

2. The energy absorbing apparatus of claim 1, wherein the at least one serration includes a plurality of serrations that provide for a variety of tolerances.

3. The energy absorbing apparatus of claim 1, wherein the second connector includes a spring finger in selective engagement with the at least one serration.

4. The energy absorbing apparatus of claim 3, wherein the at least one serration includes a cam surface for ratcheting the spring finger and a wedge surface for catching the spring finger.

5. The energy absorbing apparatus of claim 4, wherein the cam surface extends at first angle and the wedge surface extends at a second angle different than the first.

6. The energy absorbing apparatus of claim 3, wherein the second connector further includes an opening for accommodating the tail and the spring finger extends into the opening.

7. An energy absorbing apparatus for a steering column comprising:
a strap body extending between a first end and a second end;
a curved portion located between the first end and the second end; and
the first end including a first connector and the second end including a second connector selectively connected to the first connector, wherein at least a portion of the strap body defines at least one row of teeth.

8. The energy absorbing apparatus of claim 7, wherein the at least one row of teeth includes a plurality of first sized teeth and at least one second sized tooth that is larger than the plurality of first sized teeth.

9. The energy absorbing apparatus of claim 8, wherein the plurality of first sized teeth are located between the curved portion and the at least one second sized tooth.

10. An energy absorbing apparatus for a steering column comprising:
a strap body extending between a first end and a second end;
a curved portion located between the first end and the second end; and
the first end including a first connector and the second end including a second connector selectively connected to the first connector, wherein the first connector includes a first aperture and the second connector includes a second aperture and a fastener extends through the first aperture and the second aperture to connect the first end to the second end.

11. An energy absorbing apparatus for a steering column comprising:
a strap body extending between a first end and a second end;
a curved portion located between the first end and the second end; and
the first end including a first connector and the second end including a second connector selectively connected to the first connector, wherein the first connector includes a first aperture and the second connector includes a second aperture and a fastener extends through the first aperture and the second aperture and the aperture in the first jacket to connect the first end to the second end.

12. A steering column comprising:
a first jacket and a second jacket that is axially movable with respect to the first jacket;
the first jacket including an aperture;
an energy absorbing apparatus including a strap body extending between a first end and a second end;
a curved portion located between the first end and the second end; and
the first end including a first connector and the second end including a second connector selectively connected to the first connector through the aperture in the first jacket.

13. The steering column of claim 12, wherein the first jacket includes a notch having a wedge-shape on a terminal end thereof and the curved portion is located within the notch.

14. The steering column of claim 13, wherein the first jacket defines an aperture having a wedge-shape spaced from the notch.

15. The energy absorbing apparatus of claim 14, wherein the first connector includes a tail portion having a wedge-shape for forming a wedged interface between the tail portion and the aperture on the first jacket.

16. The energy absorbing apparatus of claim 15, wherein the tail portion includes at least one serration and the second connector includes an opening with a spring finger that cinches to the at least one serration and draws the curved portion into the notch.

17. The energy absorbing apparatus of claim 12, wherein the first connector includes a first aperture and the second connector includes a second aperture and a fastener extends through the first aperture and the second aperture and the aperture in the first jacket to connect the first end to the second end.

18. The energy absorbing apparatus of claim 12, wherein the second jacket includes a channel and the strap body includes at least one ear that is guided within the channel.

* * * * *